(12) United States Patent
MacNeil et al.

(10) Patent No.: US 10,478,870 B2
(45) Date of Patent: *Nov. 19, 2019

(54) METHOD AND APPARATUS FOR HIGH PRESSURE WATER TREATMENT OF THE INSIDE OF A PIPE SECTION

(71) Applicant: Mac & Mac Hydrodemolition Inc., Surrey (CA)

(72) Inventors: Gerard J. MacNeil, Surrey (CA); David B. MacNeil, Surrey (CA); Gordon MacNeil, Surrey (CA); Vernon Bose, Surrey (CA); Jesse MacNeil, Surrey (CA); Brett MacNeil, Surrey (CA)

(73) Assignee: MAC & MAC HYDRODEMOLITION INC. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,118

(22) Filed: Dec. 19, 2016

(65) Prior Publication Data

US 2017/0095846 A1 Apr. 6, 2017

Related U.S. Application Data

(62) Division of application No. 14/795,683, filed on Jul. 9, 2015, now Pat. No. 9,566,621.

(30) Foreign Application Priority Data

Jul. 14, 2014 (CA) ..................................... 2858738

(51) Int. Cl.
*B08B 9/043* (2006.01)
*F16L 57/06* (2006.01)
(Continued)

(52) U.S. Cl.
CPC .............. *B08B 9/0433* (2013.01); *B08B 9/00* (2013.01); *B08B 9/0321* (2013.01); *F16L 55/18* (2013.01);
(Continued)

(58) Field of Classification Search
CPC ... B08B 9/0433; B08B 9/0553; B08B 9/0551; B08B 9/049; F16L 55/46
(Continued)

(56) References Cited

U.S. PATENT DOCUMENTS 2,348,714 A * 5/1944 DeFiore .............. B05B 13/0654
118/318
2,910,042 A * 10/1959 Gallmeyer ................ B05C 7/08
118/105

(Continued)

FOREIGN PATENT DOCUMENTS

| EP | 1565279 | 6/2004 |
| WO | WO 2000/006312 | 2/2000 |
| WO | WO2000/006312 | 2/2000 |

*Primary Examiner* — David G Cormier
*Assistant Examiner* — Thomas Bucci
(74) *Attorney, Agent, or Firm* — Matthew A. Pequignot; Pequignot + Myers (57) ABSTRACT

Material lining the inside surface of a section of pipe is removed by a hydrodemolition nozzle assembly mounted on a working end of an elongated boom. The opposed end of the boom is supported outside the pipe on a movable support for inserting and retracting the boom from the inside of the pipe. The nozzles remove the liner while the working end of the boom is supported by a wheel resting on the liner that has not yet been removed and that rolls along the inside liner as the pipe is made to revolve around the boom. The nozzles are oriented to eject the liner and water downstream and away from the boom.

4 Claims, 8 Drawing Sheets

(51) Int. Cl.
*F16L 55/18* (2006.01)
*B08B 9/032* (2006.01)
*B08B 9/00* (2006.01)
*F16L 58/10* (2006.01)
*B08B 3/04* (2006.01)
*B08B 3/02* (2006.01)
*B08B 3/00* (2006.01)
*B08B 9/02* (2006.01)
*B08B 1/00* (2006.01)
*B08B 9/04* (2006.01)
*B08B 9/027* (2006.01)

(52) U.S. Cl.
CPC .......... *F16L 57/06* (2013.01); *F16L 58/1027* (2013.01); *B08B 1/00* (2013.01); *B08B 3/00* (2013.01); *B08B 3/02* (2013.01); *B08B 3/024* (2013.01); *B08B 3/04* (2013.01); *B08B 9/021* (2013.01); *B08B 9/027* (2013.01); *B08B 9/032* (2013.01); *B08B 9/04* (2013.01)

(58) Field of Classification Search
USPC ... 134/166 C, 167 C, 22.12, 8, 22.11, 166 R, 134/168 C, 169 C, 22.18, 22.1; 15/104.061, 104.062, 104.05, 104.16, 15/104.09, 104.31, 236.01, 406, 93.1; 118/306, DIG. 10, 317, 105, 254, 318, 118/408; 451/46, 51, 102
See application file for complete search history.

(56) References Cited

U.S. PATENT DOCUMENTS

| | | | | |
|---|---|---|---|---|
| 3,078,823 A * | 2/1963 | Cummings | B05C 7/08 | 118/306 |
| 3,135,629 A * | 6/1964 | McLean | B05C 7/08 | 118/408 |
| 3,177,902 A * | 4/1965 | Rubenstein | B28B 21/64 | 138/145 |
| 3,180,312 A * | 4/1965 | Handley | B05B 7/166 | 118/302 |
| 3,427,763 A | 2/1969 | Maasberg et al. | | |
| 3,600,736 A * | 8/1971 | Smith | B08B 9/0553 | 15/104.061 |
| 3,835,587 A * | 9/1974 | Hall, Jr. | B24C 3/325 | 451/38 |
| 4,011,100 A * | 3/1977 | Ross | B08B 9/0322 | 134/8 |
| 4,016,681 A * | 4/1977 | Leliaert | B24C 3/00 | 451/76 |
| 4,144,898 A * | 3/1979 | Guignon | B08B 9/093 | 134/113 |
| 4,177,734 A * | 12/1979 | Rhoden | B08B 9/049 | 104/138.2 |
| 4,225,083 A * | 9/1980 | Kubo | B05B 13/06 | 239/132.3 |
| 4,340,010 A * | 7/1982 | Hart | B05B 13/06 | 118/306 |
| 4,369,713 A * | 1/1983 | Richardson | B08B 9/049 | 104/138.2 |
| 4,380,477 A * | 4/1983 | Saunders | B24C 5/02 | 134/7 |
| 4,508,577 A * | 4/1985 | Conn | B08B 9/035 | 134/1 |
| 4,600,444 A * | 7/1986 | Miner | B08B 9/021 | 134/10 |
| 4,805,653 A * | 2/1989 | Krajicek | B08B 9/0323 | 134/166 C |
| 5,002,120 A * | 3/1991 | Boisture | B65H 75/4402 | 122/391 |
| 5,067,558 A * | 11/1991 | Boisture | B65H 75/4402 | 122/379 |
| 5,081,800 A * | 1/1992 | Ruholl | B08B 9/051 | 180/21 |
| 5,113,885 A * | 5/1992 | Ramsey | B08B 9/049 | 118/306 |
| 5,129,455 A * | 7/1992 | Boisture | B65H 75/4402 | 122/379 |
| 5,146,644 A * | 9/1992 | Crocco | B08B 9/045 | 15/104.12 |
| 5,175,964 A * | 1/1993 | Girndt | B23Q 9/0014 | 451/178 |
| 5,239,786 A * | 8/1993 | Carpenter | B24C 3/325 | 451/38 |
| 5,317,782 A * | 6/1994 | Matsuura | B08B 9/051 | 15/304 |
| 5,829,461 A * | 11/1998 | Ramsey | B08B 9/0433 | 134/167 R |
| 6,390,105 B1 * | 5/2002 | Ramsey | B08B 9/0433 | 118/306 |
| 6,418,947 B1 * | 7/2002 | MacNeil | B08B 9/0433 | 134/166 C |
| 6,550,486 B2 * | 4/2003 | MacNeil | B08B 9/0433 | 134/22.11 |
| 6,644,325 B2 * | 11/2003 | MacNeil | B08B 9/0433 | 134/22.11 |
| 7,128,074 B2 * | 10/2006 | MacNeil | B08B 9/0433 | 134/22.11 |
| 7,159,600 B2 * | 1/2007 | MacNeil | B08B 9/0433 | 134/166 C |
| 7,172,083 B1 | 2/2007 | Raines | | |
| 8,048,234 B2 * | 11/2011 | Jacquinet | B08B 9/0433 | 134/167 C |
| 8,057,607 B2 * | 11/2011 | Gardner | B08B 9/04 | 134/166 C |
| 8,394,205 B2 | 3/2013 | MacNeil | | |
| 9,751,116 B2 * | 9/2017 | MacNeil | B08B 9/0433 | |
| 2002/0056166 A1 * | 5/2002 | Clunie | B08B 9/00 | 15/104.095 |
| 2002/0179123 A1 * | 12/2002 | Toward | B08B 3/02 | 134/34 |
| 2003/0039752 A1 * | 2/2003 | Winiewicz | B05B 13/0636 | 427/236 |
| 2004/0025912 A1 * | 2/2004 | MacNeil | B08B 9/0433 | 134/167 C |
| 2007/0161339 A1 * | 7/2007 | Wentworth | B24B 5/40 | 451/51 |
| 2007/0214994 A1 * | 9/2007 | Ardente | B62D 61/06 | 104/138.1 |
| 2010/0139019 A1 * | 6/2010 | Geppert | B08B 9/0433 | 15/104.061 |
| 2012/0067184 A1 * | 3/2012 | Hach | B26F 3/00 | 83/177 |
| 2012/0103153 A1 * | 5/2012 | MacNeil | B05B 3/06 | 83/53 |
| 2012/0103368 A1 * | 5/2012 | Gromes, Sr. | B08B 9/0433 | 134/22.12 |
| 2013/0220389 A1 * | 8/2013 | Snow | B08B 9/032 | 134/166 C |
| 2014/0261559 A1 * | 9/2014 | MacNeil | B08B 9/0433 | 134/22.12 |

* cited by examiner

METHOD AND APPARATUS FOR HIGH PRESSURE WATER TREATMENT OF THE INSIDE OF A PIPE SECTION

RELATED APPLICATION DATA

This application is a divisional of U.S. patent application Ser. No. 14/795,683, filed Jul. 9, 2015, which claims priority to Canadian Patent Application No. 2,858,738, filed Jul. 14, 2014. All claims of priority to these applications are hereby made, and these applications are hereby incorporated in their entirety by reference.

FIELD OF THE INVENTION

This invention relates to a method and apparatus for treating the inside of a section of pipe to remove liners by hydrodemolition.

BACKGROUND OF THE INVENTION

Removing degraded coatings and liners is the first step to reconditioning the inside surface of a pipe and is performed before new coatings or liners are applied. The inside surfaces of some larger pipes may be reconditioned while the pipes remain in the ground. Such may be the case for example for sewer pipes. In other cases, for example removing and replacing the insider liners of oil pipelines, sections of pipe are removed from the pipeline, collected and delivered to be reconditioned at a remote location.

High pressure water may be used to remove the inside liners of pipes by hydrodemolition, namely by fluid blasting the exposed surface to disintegrate and remove the liners. In the case of embedded or installed pipes, it is generally known to mount hydrodemolition nozzles on robots or to tow separate high pressure water nozzle assemblies along the inside of the pipeline by remote controlled tractors. The robot or the tractor moves along the inside of the pipe while the nozzles treat the inside surfaces. Examples of such systems are disclosed in U.S. Pat. No. 8,394,205 and WO 00/06312, both to MacNeil et al.

The use of in-pipe robots or tractors is inconvenient in the case of pipe sections that are short and small enough to be transported to a remote location to be treated. Robots and tractor systems require repeatedly reinstalling the robot or tractor assembly within successive relatively short pipe sections, in each case reattaching hoses and resetting the apparatus for the new pipe section to be worked. In oil pipeline reconditioning as in the case of many other types of pipes, reducing the turn-around time is of primary importance to the customer.

Treating the inside of a pipe using high pressure water nozzles also requires providing sufficient articulation and movement of the nozzles or nozzle assemblies to enable the water to work the entire circumferential area within the pipe. Various articulation arrangements have been proposed. One example is E.P. 1,565,279 to MacNeil et al. that discloses a wheeled frame that supports opposed pivotable and extendible arms, the distal ends of which comprise nozzle assemblies.

The use of various materials to line conduits such as pipelines and the like is well known and essential in many industries. For instance, in the field of piping crude or diluted bitumen from tar sands extraction to a storage facility or refinery, the internal surface of the metal pipe segments (each segment being typically 50 feet in length) that comprise the pipeline are often lined with a layer of a rubber compound (usually about 0.25 inches thick) that is adhered to the metal on the inside of the pipe, followed by a urethane layer (usually about 0.75 inches thick) that is adhered to the rubber layer. In other applications, the lining material may vary in thickness, composition or in other aspects. The lining of the pipelines wears or deteriorates over time, and it becomes necessary to periodically remove and replace the affected pipe segments in the pipeline. Being of different materials and thickness, each of the two layers requires a different set of operating conditions for its removal. A urethane layer having a thickness of about 0.75 inch may typically be removed by a single pass of water jets that are mounted within a few inches of the surface of the urethane and at a pressure of 15,000-20,000 psi. The number of nozzles may be varied so that a given area of surface is targeted by more than nozzle in succession thereby varying the operational parameters required to completely remove the urethane. The subsequent removal of an underlying rubber liner that is about 0.25 inch thick may be accomplished by a single pass using ultra-high water pressures of about 40,000 psi (using different nozzles). In fact, the individual layers may be removed variously using either high or ultra-high pressure water depending on operational parameters that include the distance of the nozzle from the surface, the number of passes by a nozzle, the debit volume from the nozzle, the spray pattern, movement or spinning of the nozzle and the dwell time. As a result, a first pass is typically conducted along the pipe section to remove the urethane layer using a first set of nozzles or operational parameters, followed by a second pass, using a second set of nozzles or operational parameters.

The use of high and ultra-high pressure water results in a significant amount of water and other debris (including shredded liner or pieces of liner), being displaced within the pipe, as well as introducing significant lateral stresses on the nozzle assemblies.

It is an object of this invention to provide a method and apparatus for treating the inside surface of pipe sections by hydrodemolition in an efficient manner.

It is a further object of this invention to provide a method and apparatus for efficiently removing the interior surface liners of pipe sections that have at least two layers of liner using hydrodemolition.

These and other objects of the invention will be better understood by reference to the detailed description of the preferred embodiment which follows. Note that the objects referred to above are statements of what motivated the invention rather than promises. Not all of the objects are necessarily met by all embodiments of the invention described below or by the invention defined by each of the claims.

SUMMARY OF THE INVENTION

In aspects of the invention, a section of pipe is mounted for rotation about the longitudinal axis of the pipe. An elongated boom is supported at one end outside the pipe. An opposed working end of the boom is introduced into the pipe. At least one hydrodemolition high pressure water nozzle is mounted at the working end of the boom and is directed against the inner surface of the pipe to disintegrate a liner on the inside surface of the pipe by hydrodemolition. During treatment of the inside surface of the pipe by the hydrodemolition nozzle, the boom and the nozzle remain in a substantially stationary orientation while the pipe is revolved around the boom. The working end of the boom is supported against the inside of the pipe by at least one wheel or roller having an axis of rotation that is parallel to the longitudinal axis of the boom. The nozzle(s) is(are) angled toward the far end of the pipe so that water and debris are preferentially expelled from the far end of the pipe throughout the operation.

The boom is gradually retracted from the pipe, while the water and debris continue to be expelled from the far end of the pipe. Retraction of the boom is enabled by the support wheel of the working end of the boom rolling circumferentially about the inside of the pipe while the pipe revolves, allowing the wheels to progress longitudinally along the pipe as the boom is retracted, provided the speed of retraction of the boom is not excessive.

The boom is stabilized by the support wheel against the bending moments caused by the ejection of high pressure water from the nozzles, and preferably by additional angularly spaced bracing wheels or rollers so as to effectively brace the working end of the boom against the liner inside the pipe in the event of swaying of the boom. The support and bracing wheels or rollers are positioned upstream of the nozzle(s) so that they ride on liner that has not yet been removed as the working end of the boom progresses down the length of the pipe.

The structure supporting the end of the boom outside the pipe is movable, preferably along rails, so as to gradually withdraw the boom from the pipe as the pipe continues to revolve around the boom and nozzle. Water and debris continue to be expelled preferentially from the far end of the pipe during the retraction hydrodemolition operation due to the angle of the nozzles.

In one aspect, an indexing system gradually withdraws the boom from the pipe at a rate selected to ensure that the liner is completely removed as the operation progresses. The rate of withdrawal of the boom is coordinated with the speed of rotation of the pipe to prevent dragging the support wheels sideways across the surface of the liner.

In another aspect, the nozzle assembly comprises a plurality of nozzles are disposed in fixed angularly spaced positions about the working end of the boom for greater water jet coverage of the interior surface of the pipe as the pipe rotates.

In yet another aspect, selective use of a wheel with an axis of rotation that is transverse to the longitudinal axis of the boom allows the working end of the boom to be introduced into and rolled from the end of the pipe adjacent the external boom support structure and toward to the far end of the pipe. The wheel may be removed or retracted before the liner removal operation begins, or it may be selectively oriented to roll the working end of the boom on a support surface as it exits the pipe, or when re-oriented to act as a support wheel within the revolving pipe.

In a further aspect of the invention, there may be provided an exit support platform for supporting the working end of the boom as it is being withdrawn from the pipe, but while the nozzle(s) have not yet completely removed the liner near the end of the pipe. The exit platform provides a support surface for the removable wheel to roll onto at a height that matches the liner surface on which the support wheel rests. The exit platform may further comprise additional support surfaces at suitable elevations and angles for enabling the additional support wheels to rest against the additional support surfaces when the working end of the boom is exiting the pipe.

Water is supplied to each of the nozzles at the working end of the boom preferably by means of hoses. The boom may include brackets at spaced intervals along the length of the boom to retain the hoses. Alternatively, water may be supplied to the nozzle assembly by a conduit located within the boom.

The working end of the boom may include different sets of nozzles one of which is downstream of the other to enable the removal of a first surface layer of liner using a first set of operating parameters and the removal of the underlying layer using a second set of operating parameters in a single pass. Where both high and ultra-high pressure water is used, separate hoses or conduits are provided to supply the water to the nozzle assemblies.

In a preferred embodiment, two pairs of nozzles are mounted at opposing ends of a rotating arm downstream of other nozzles. The pairs of nozzles are shielded from the water jets and debris from the high pressure nozzles.

In a further aspect, the invention is a method for removing an inside liner from a pipe by hydrodemolition using high pressure water, the pipe having a proximal end and a distal end. The method comprises mounting the pipe on a support structure for rotation of the pipe about its longitudinal axis. An elongated boom is provided having at least one high pressure water nozzle at a first end of the boom, the boom and nozzle being insertable into said pipe. The first end of the boom is inserted into the pipe and an opposite end of the boom is supported outside the pipe such that the boom is aligned axially with the longitudinal axis of the pipe. The first end of the boom is supported on the liner inside the pipe on at least one roller having an axis of rotation parallel to the longitudinal axis of the pipe. Simultaneously, the pipe is revolved about its longitudinal axis on its support structure, a high pressure water spray is produced from the nozzle in a substantially fixed direction in relation to the boom to disintegrate the liner by hydrodemolition and the boom is retracted from the pipe as the roller rolls circumferentially about the inside of the revolving pipe. A rate of rotation of the pipe in relation to the speed of retraction of the boom is selected and used to ensure substantially full removal of the liner as the pipe revolves while also enabling the roller to travel along the circumference of the pipe without substantial longitudinal friction.

In another aspect, the substantially fixed direction is at an angle between the longitudinal axis of the pipe and the radial direction and toward the first end of the pipe so as to eject the liner and water toward the distal end of the pipe.

In another aspect, prior to the step of inserting the boom into the pipe, the first end of the boom is supported on an inside liner at the proximal end of the pipe by means of at least one roller having an axis of rotation that is transverse to a longitudinal axis of the pipe, the first end of the boom is inserted into the proximal end of the pipe and toward the distal end while rolling the first end of the boom on the roller along the liner; and prior to the step of simultaneously revolving the pipe, the roller is removed from contact with the liner or the axis of rotation of the roller is changed to be parallel to the longitudinal axis.

In another aspect, as the first end of the boom exits the pipe, an exit platform having a surface for supporting the one roller is used.

In another aspect, the exit platform further comprises at least one additional support surface for supporting an additional roller provided on the end of said boom.

In an apparatus aspect, the invention is a hydrodemolition apparatus for removing a liner material from the inside surface of a cylindrical structure, comprising a support for supporting the cylindrical structure in a horizontal orientation, a rotation mechanism cooperating with the support to enable the cylindrical structure to be rotated about a longitudinal axis of the structure and an elongated boom partially insertable into the structure, a first end of the boom comprising one or more nozzles oriented to deliver a high pressure jet of water to the liner to disintegrate the liner by hydrodemolition. A portion of the boom that is distal from the first end of the boom is supported outside of the cylindrical structure and there is provided a displacement mechanism for displacing the boom in a longitudinal direction in relation to the boom. The apparatus further comprises at least at least one boom end support adjacent the first end of the boom, the boom end support being adapted to roll circumferentially along the inside of the cylindrical structure.

In another aspect, the boom end support comprises at least one support roller having an axis of rotation that is parallel to a longitudinal axis of the boom.

In another aspect, the one or more nozzles comprises a first set of nozzles connected to a first source of high pressure water and a second set of nozzles connected to a second source of high pressure water at a different pressure than the first source. The second set of nozzles is spaced from the first set of nozzles in a longitudinal direction of the boom.

In another aspect, there are further provided at least two bracing rollers radially spaced in relation to the first end of the boom, the axis of rotation of the bracing rollers being parallel to the longitudinal axis of the boom.

In another aspect, the support roller is spaced longitudinally away from the first end of the boom in relation to the location of the nozzles.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein for completeness.

BRIEF DESCRIPTION OF THE DRAWINGS

The invention will be described by reference to the detailed description of the preferred and alternative embodiments thereof and to the drawings in which.

DETAILED DESCRIPTION OF THE PREFERRED AND OTHER EMBODIMENTS

Figure 1:
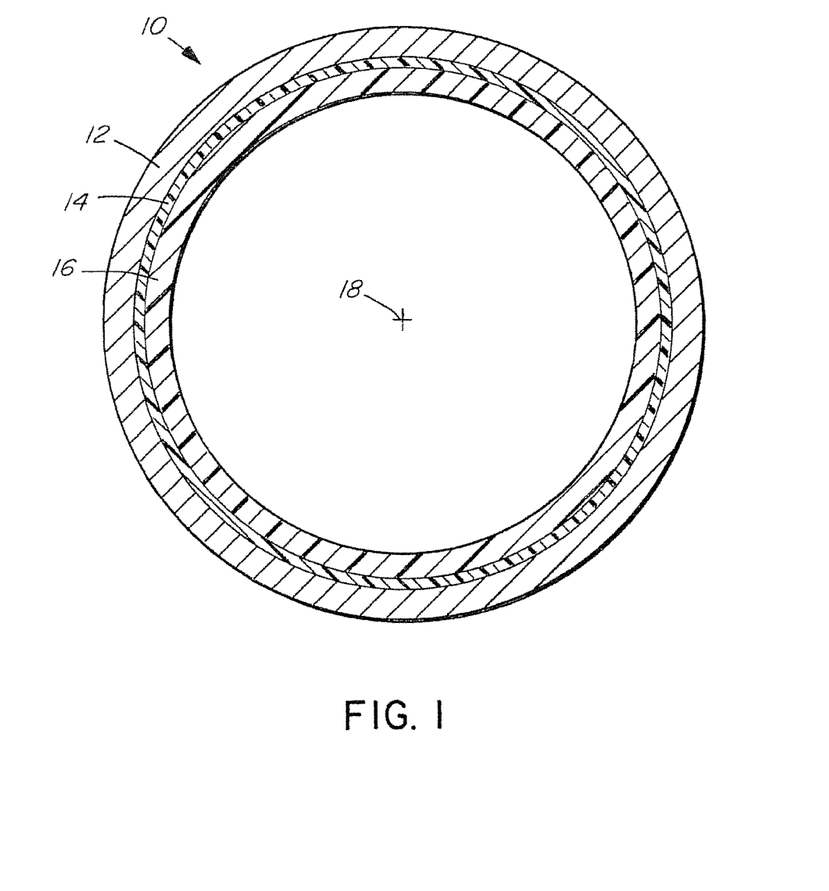
FIG. 1 is a cross sectional view of a pipe section having two layers of liner on the inside surface of the pipe.

Referring to FIG. 1, a section of pipe 10 comprises an inside wall 12 having a layer of rubber 14 adhered to the interior surface of the wall 12 and a layer of urethane 16 adhered to the rubber layer 14. In FIG. 1, the wall 12, the rubber layer 14 and the urethane layer 16 appear as concentric rings about a central pipe axis 18. Pipe segments of the kind illustrated are used in pipelines for conveying diluted bitumen after it has been extracted from oil sands to a storage/shipping facility or refinery. Typically, the pipe segments are about 50 feet long. As well, depending on the application of the pipeline, the pipe segments may comprise only one layer of lining material, or they may have a plurality of layers or lining material. Two layers are disclosed in relation to the preferred embodiment but aspects of the invention may be practiced with a single layer or more than two layers of various materials. While the present invention is described and illustrated in application to pipe used in pipelines for moving diluted bitumen, the scope of the invention goes beyond those pipelines.

Figure 2:
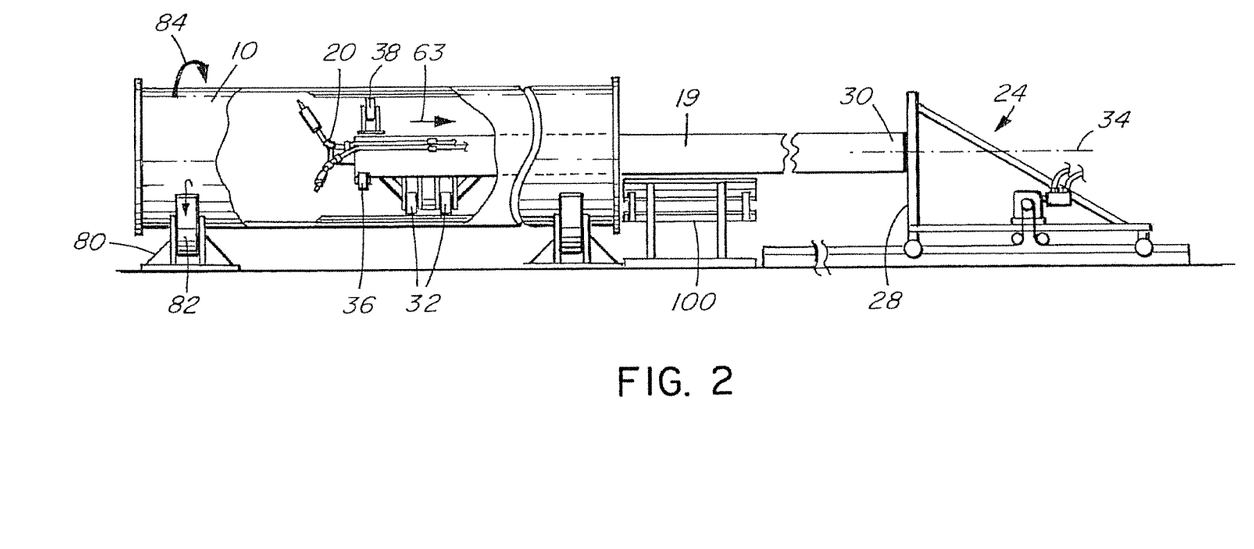
FIG. 2 is a side elevation of the boom-mounted hydrodemolition system and its external support structure and further showing the working end of the boom in a cut away of the pipe and the support wheels or rollers for the working end of the boom.

FIG. 2 illustrates an elongated rigid boom 19 according to a preferred embodiment. A nozzle assembly 20 is mounted at one end 22 (referred to herein as the "working end") of the boom 19. A support structure 24 maintains a proximal end 26 of the boom 19 at a suitable height to enable it to be introduced longitudinally into a section of pipe 10. In the preferred embodiment, the support structure 24 comprises a frame 28.

The support structure 24 preferably supports the end 30 of the boom that is opposed to the working end 22. However, support may be provided at a location other than at the very end 30, for example at a point closer to the pipe 10, provided that a sufficiently long section of the boom remains unobstructed by the support structure so as to allow the introduction of the boom into the pipe at the desired distance.

Figure 3:
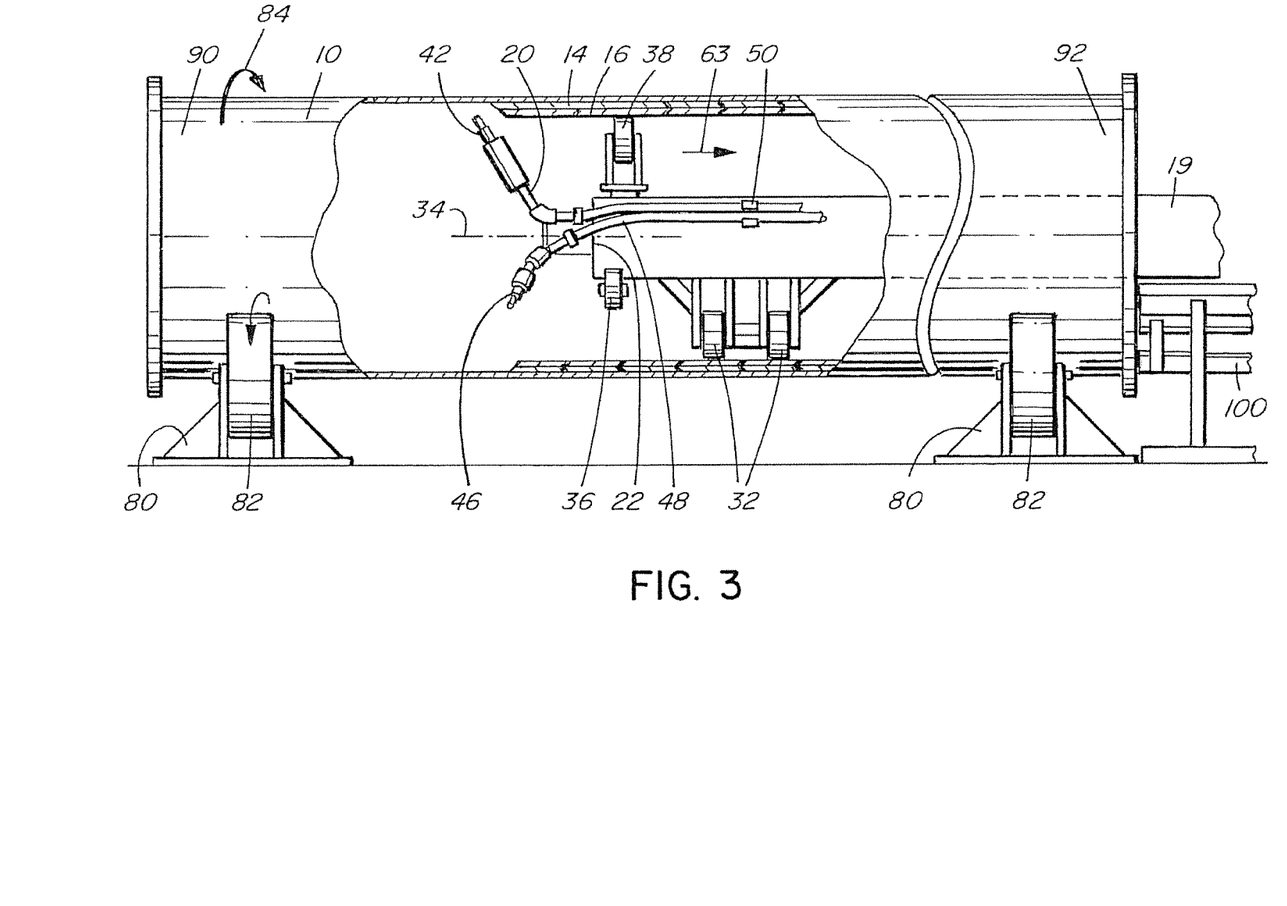
FIG. 3 is side elevation of the boom-mounted nozzle assembly within a pipe, with a cut-away showing the working end of the boom.
Figure 4:
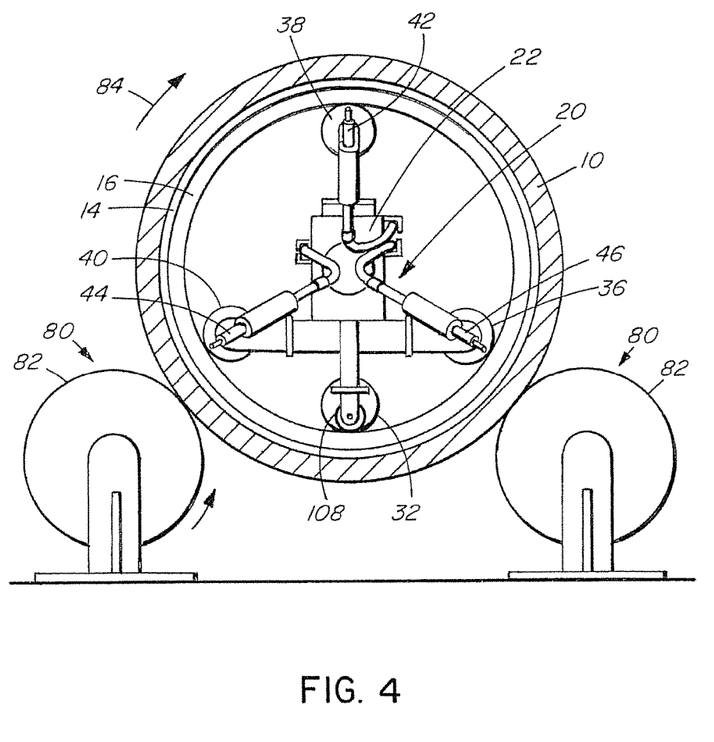
FIG. 4 is a cross sectional view of the view of a pipe looking into the working end of the boom, showing support, bracing and a retractable wheels and layers of liner.

Referring to FIGS. 3 and 4, the working end 22 of the boom 19 is supported by support wheels 32 that extend downward from the boom along its vertical axis to rest on the inside of the pipe 10. The axes of rotation of the wheels 32 are parallel to the longitudinal axis 18 of the pipe and to the longitudinal axis 34 of the boom. Support wheels 32 are spaced longitudinally inward along the boom compared to the location of the one or more nozzles 42, 44, 46. That location ensures that the support wheels 32 will ride on liner that has not yet been removed by the nozzles as the boom is retracted from the pipe. This minimizes obstructions to the wheels 32 from uneven joints, welds or defects that might be present on the base structure of the pipe.

Additional bracing wheels or rollers 36, 38, 40 have axes of rotation that are also parallel to the longitudinal axis 18 of the pipe and to the longitudinal axis 34 of the boom 19. Wheels 36, 38, 40 are preferably arranged so as to be equally angularly spaced from one another around the longitudinal axis 34 of the boom 19. Such spacing allows bracing of the boom 19 against the inside liner 16 of the pipe 10 and to maintain the boom substantially centered in the pipe while the pipe revolves around the boom. In the preferred embodiment, the bracing wheels 36, 38, 40 are recessed from the positions that would cause the wheels to constantly engage the liners, such that there is not necessarily continuous contact of the additional wheels with the liners but they can accommodate continuous or intermittent contact. This enables the insertion of the boom into pipes of slightly varying diameters. The bracing wheels 36, 38, 40 nonetheless ensure that the working end 22 of the boom remains reasonably centered in relation to the pipe as the working end of the boom reacts to the pressure of the water being ejected from the nozzle assembly 20.

The boom 19 may comprise any suitable straight elongated member that is capable of supporting the nozzle assembly 20, the hoses (discussed below) and the water they carry to supply the nozzles. The boom 19 preferably comprises an elongated, rigid, hollow steel casing of rectangular cross-section to provide the rigidity and stability needed to withstand the torques and dynamic stresses of high pressure and ultra-high pressure water being ejected from the nozzle assembly 20.

The nozzle assembly 20 comprises at least one nozzle 42 mounted in a fixed orientation on the working end 22 of the boom. In the preferred embodiment of the invention, the nozzle(s) do not rotate around the working end 22 of the boom in order to treat the circumferential inner surface of the pipe. The nozzle(s) effectively remain directed at a specific area while the pipe 10 revolves around the boom 19 and around the nozzle assembly 20. However, the reference to a "fixed orientation" in this disclosure and in the claims should be taken to include the possibility of the nozzle tip precessing about the nominal longitudinal axis of the nozzle, as is known in the art of high pressure water nozzles used for hydrodemolition.

Referring to FIG. 4, in the preferred embodiment, the nozzle assembly 20 comprises three nozzles 42, 44, 46 all being equally angularly spaced from one another with respect to the longitudinal axis 34 of the boom 19. Each of the nozzles 42, 44 and 46 has a nominal ("nominal" to account for some precession) spray angle that is outward and away from the boom 19 (as best appreciated by reference to FIG. 3) such that the high pressure water is directed toward the inner surface of the pipe 10 but away from the boom 19. The angle is between the longitudinal axis and the radial direction of the boom. The inventors have found that a relatively small angle of 30 degrees from the vertical is sufficient to cause any excess water and debris to be preferentially directed away from the end of the working end of the boom.

Figure 7:
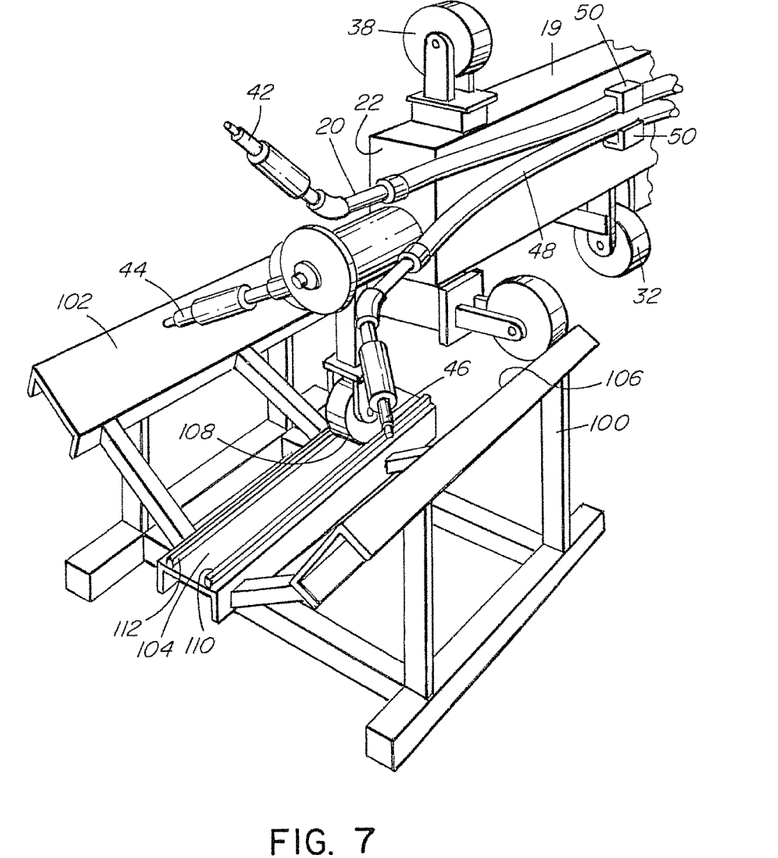
FIG. 7 is a perspective view of the working end of the boom and the exit platform.

Preferably each of the nozzles 42, 44, 46 is fed by a hose, exemplified by hose 48 in FIGS. 3 and 7. Brackets 50 are provided at spaced locations along the length of the boom to support the hoses. In an alternative embodiment, the boom is in the form of a hollow rectangular structure and the hoses are housed within the cavity of the structure along the length of the boom. In yet another embodiment, rigid water supply conduits are provided within the body of the hollow member that forms the boom 19.

The support structure 24 is mounted on rails (only one of which, 60, is visible in the drawings) to guide and maintain the boom 19 in alignment with the pipe 10. A motor 62 is provided to index the boom support structure 24 and hence the boom 19 at a controlled speed for withdrawal from the pipe 10 in the direction shown by arrow 63. In the preferred embodiment, a chain 64 is secured to a position adjacent the pipe end 66 of the rails 60 (see FIG. 5) and to a position 68 that is distal from the pipe along the rails to enable the boom to be drawn into or out of the pipe by indexing the support structure along the chain. In an embodiment, the support structure 24 tracks along the chain 64 by means of a driven sprocket 70 and idlers 72. The indexing system gradually withdraws the boom from the pipe at a rate selected to ensure that the liner is completely removed as the operation progresses. The rate of retraction of the boom is coordinated with the speed of rotation of the pipe to prevent dragging the support wheels 32 sideways across the surface of the liner, allowing the wheels 32 to instead track along the inner circumference of the pipe.

Embodiments of the invention generally comprise a support 80 that supports the pipe section 10 in a desired orientation, usually horizontally, and a rotation mechanism 82 connected to or cooperating with the support 80 that enables rotation of, or actively rotates, the pipe 10 about its longitudinal axis 34, the rotation being indicated by arrow 84.

In the simplest of embodiments, the support 80 may comprise a one or more frame members that are suitable for supporting the weight of a section of pipe 10 horizontally, and the rotation mechanism 82 may comprise a plurality of wheels or rollers connected to the frame members on which the pipe rests, wherein the axis of rotation of each roller is parallel to the longitudinal axis 34 of the pipe 10 so that the pipe may be rotated about its axis 34. In more elaborate embodiments, the support 80 may comprise a stacking and conveying apparatus that is able to store a plurality of pipe sections and convey one section at a time to the rotation mechanism for processing by the hydrodemolition apparatus.

FIG. 3 shows the boom 19 including its working end 22 introduced into the section of pipe 10 and illustrates a layer of urethane 16 and rubber 14 that has yet to be removed.

A typical liner removal operation commences with the working end 22 of the boom 19 and the nozzle assembly 20 disposed at the distal end 90 of the pipe 10. The support wheels 32 rest on the innermost liner 14 of the pipe 10. The high pressure water spray from the nozzles 42, 44, 46 impinges on the surface of the liner 14. Due to the angle of the nozzles, any reflected water and removed liner are directed preferentially rearward away from the boom ("downstream") and out the distal end 90 of the pipe 10. The pipe simultaneously revolves about the nozzle assembly 20 allowing an entire circumferential swath of liner to be removed from the pipe by the nozzle assembly. As the axis of rotation of the wheels 32 is parallel to the axis of rotation of the pipe 10, the support wheels 32 turn and track along the inner circumference of the pipe, allowing the pipe 10 to revolve around the working end 22 of the boom and allowing the working end of the boom to remain in a static orientation. As the pipe 10 revolves around the boom 19, the support structure 24 is drawn away from the pipe 10 thereby withdrawing the boom 19 and the nozzle assembly 20 from the distal end 90 of the pipe, and thereby allowing the removal of liner to progress along the inside of the pipe. By controlling the speed of retraction of the boom 19 and the speed of rotation of the pipe 10, an optimal removal of liner is achieved while also allowing the support wheels 32 and any additional bracing wheels 36, 38, 40 that may be in contact with the liner to gradually progress longitudinally of the pipe without being dragged sideways along the liner.

As the nozzles remain angled away from the boom in a downstream direction, any removed liner and water is expelled toward the distal end 90 of the pipe, until the working end of the boom eventually reaches the proximal end 92 of the pipe and all of the liner has been removed.

Figure 5:
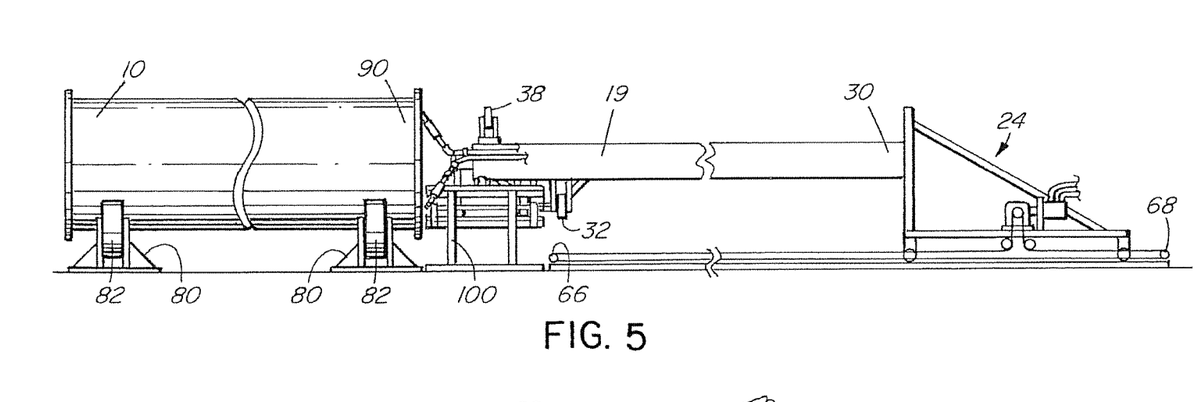
FIG. 5 is a side elevation of the boom mounted nozzle assembly and an exit platform as the boom-mounted nozzle assembly exits the pipe.
Figure 6:
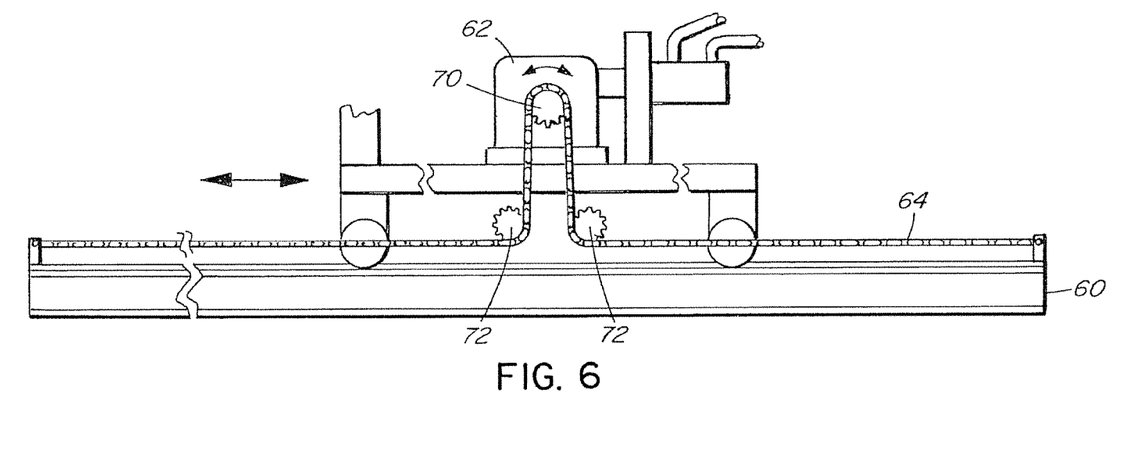
FIG. 6 is a side view of the displacement drive mechanism and chain for the support structure.

When the boom has almost reached the proximal end 92 of the pipe, the wheels 32, 36, 38, 40 will exit the pipe before the nozzle assembly 20 does. Absent any other arrangements, the working end 22 of the boom would no longer be supported by the inside of the pipe 10 although the nozzles 42, 46, 48 will not yet have removed all of the liner at the near end of the pipe. In order to accommodate this, and as illustrated in FIG. 5, an exit support platform 100 is provided adjacent the distal end of the pipe to receive the support wheels 32 and to take the weight of the working end 22 of the boom 19 once the wheels exit the pipe. Referring to FIG. 7, the exit support platform 100 comprises flat surfaces 102, 104, 106 corresponding in orientation and location to the sides of the pipe that the wheels would otherwise be rolling on. Accordingly, the support wheels 32 along with any other wheels 36, 38, 40 that may be in contact with the pipe wall ride (albeit sideways) onto the support platform 100 to take the weight of the working end of the boom.

According to the preferred embodiment, in order to minimize the stress on the wheels as they move onto the platform surfaces 102, 104, 106, a removable or retractable wheel 108 is provided on the bottom of the working end 22 of the boom. The removable or retractable wheel 108, when deployed, has an axis of rotation that is transverse to the longitudinal axis 34 of the boom 19 allowing the wheel 108 to be rolled on a surface in that longitudinal direction. The use of such wheel 108 facilitates the introduction of the working end of the boom 19 into a new pipe to be treated until the support wheels 32 can engage the liner surface of the new pipe section. The wheel 108 is then removed or retracted to allow the support wheels 32 to take the weight of the boom. A suitable flat bottom surface 104 is provided on the exit support platform 100 to accommodate rolling of the removable or retractable wheel 108, and flange portions 110, 112 are provided on the surface 104 to maintain the wheel 108 within a track on the support platform 100.

In an embodiment, wheel 108 is selectively orientable so that its axis of rotation may be either parallel to the longitudinal axis 34 of the boom, in which case it can roll along the inner circumference of the pipe, or transverse to the axis 34, in which case it can roll directly along the surface 104 of the exit support platform 100. As the working end of the boom exits the pipe, the wheel 108 is re-oriented to allow it to roll onto the surface 104.

Figure 8:
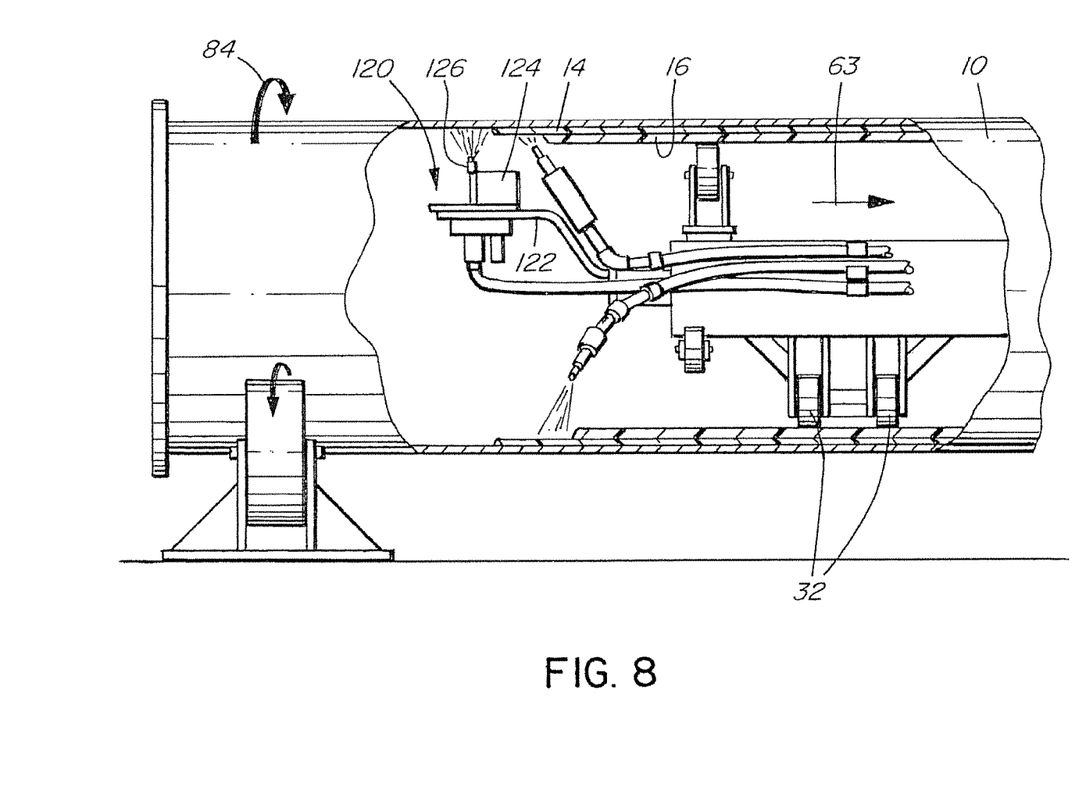
FIG. 8 is a side elevation of the working end of the boom-mounted assembly according to an embodiment of the invention that includes an ultra-high pressure nozzle assembly, within a cut-away of a pipe.
Figure 9:
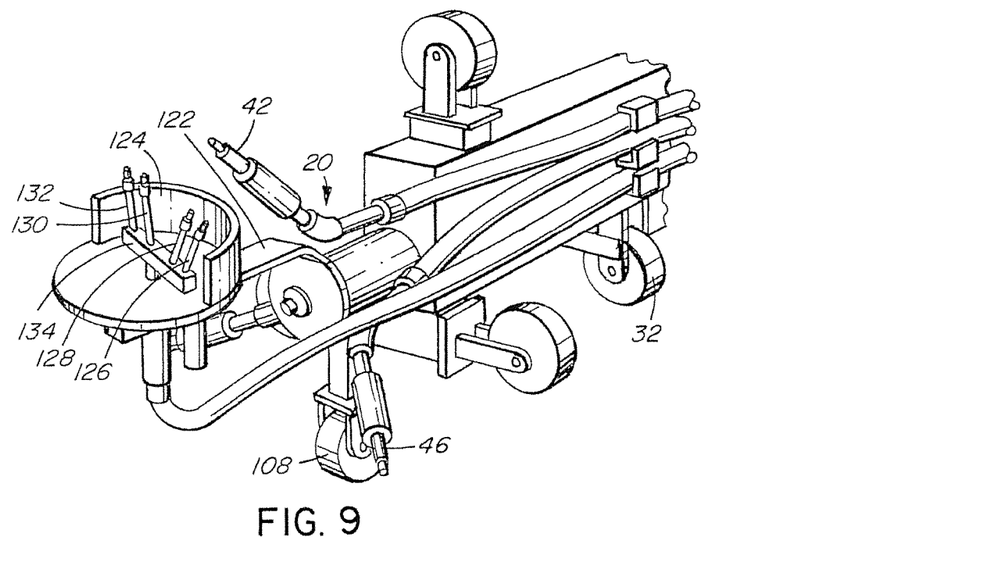
FIG. 9 is a perspective view of the ultra-high nozzle assembly mounted on the working end of the boom.
Figure 10:
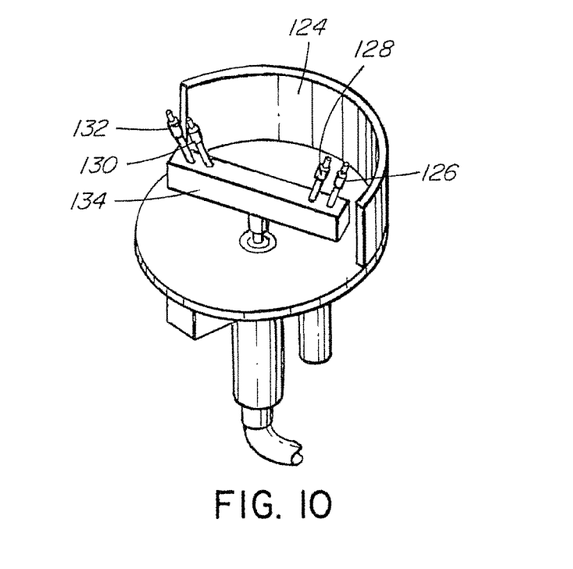
FIG. 10 is a perspective view of the ultra-high nozzle assembly.

FIG. 8 is a side elevation of an embodiment of the invention that includes a fixed ultra-high pressure nozzle assembly 120 (the "UHPNA") for removing an underlying liner (in this example rubber 14) that acts as a base for the urethane liner 16, in a single pass of the nozzle assembly 20. According to the preferred embodiment, an arm 122 extends from the nozzle assembly 20 to support an UHPNA 120 and to locate the assembly 120 downstream of the high pressure nozzle assembly 20. As a result, the ultra-high pressure nozzles impinge on the pipe downstream of the urethane liner 16 that has already been removed. Referring to FIG. 10, the UHPNA 120 comprises a truncated drum 124. The drum 124 is truncated so as to remove the downstream portion of the drum wall and to retain the upstream portion. The upstream portion of the drum wall protects the ultra-high nozzles 126, 128, 130, 132 from debris and water being ejected from the operation of the high pressure nozzles 42, 44, 46 and being reflected off the pipe while removal of the downstream portion of the drum wall enables any rubber debris or water from the ultra-high pressure nozzles to be directed downstream of the UHPNA 120. It will be appreciated that the same shielding effect can be achieved by structures and shapes other than a truncated drum.

The UHPNA 120 comprises a mounting bar 134 rotatable within the drum 124. Each of the opposed ends of the mounting bar 134 comprises a pair of ultra-high pressure water nozzles 126, 128 and 130, 132. The ultra-high pressure nozzles 126, 128, 130, 132 are slightly angled in a radially outward direction in relation to the rotation axis of the mounting bar 134. In operation, the mounting bar 134 spins within the drum 124 and the pairs of nozzles travel along the inside of the perimeter of the drum. The arm 122 and the drum 124 are located such that the UHPNA presents the ultra-high nozzles in close proximity to the inner surface of the pipe 10 so as to effectively remove the rubber liner in the same pass of the nozzle assembly as for the removal of the urethane liner by the high pressure water nozzles.

In the foregoing embodiments, the specific rate of rotation of the pipe, the rate of retraction of the boom from the pipe and the specific pressures to be used for hydrodemolition are controlled to ensure substantially full removal of the liner(s) as the pipe revolves while also enabling the wheels or rollers 32 (and if they are in contact with the pipe, wheels 36, 38, 40) to travel along the circumference of the pipe without substantial longitudinal friction.

It will be appreciated that the embodiment has been described as involving wheels, but rollers or other forms of rotating contracts are intended to be captured by the term "roller" in this disclosure and in the claims.

In another aspect, the support wheel or roller that support the boom end may be any support that is adapted to roll circumferentially of the inside of the pipe. It will be appreciated that certain bearing mechanisms provide such ability without necessarily being characterized as wheels or rollers having given axis of rotation.

In another embodiment, wheels 32 and/or wheels 36, 38, 40 and 108 are replaced with skids or skis oriented in the direction of displacement corresponding to that of the wheels. In the case of wheels 32, 36, 38, 40 skids or skis are oriented for travel in the circumferential direction of the inside of the pipe. Similarly, retractable or re-orientable wheel 108 may be replaced with a retractable or re-orientable skid or ski in a direction corresponding to the intended direction of rotation of the wheel 108.

While the preferred embodiment has been described as a high pressure nozzle assembly for removing a first outer layer of a material and a downstream ultra-high pressure nozzle assembly for removing an inner layer of material, it is within the scope of the present invention to provide an ultra-high pressure nozzle assembly upstream of a high pressure nozzle assembly. In selecting the specific arrangement as between two nozzle assemblies of different pressures, operational parameters such as the number of nozzles and their distance from the liner to be removed may be varied to achieve the desired removal of a liner using a particular configuration.

Other variations of the embodiments without necessarily departing from the broadest aspects of the invention may include for example the number of nozzles arrayed about the working end of the boom, the specific angles of the nozzles, the shape and structure of the boom, the displacement mechanism for the boom, the details of the exit platform, and the means of supporting and actuating rotation of the pipe section.

In the foregoing specification, the invention has been described with reference to specific embodiments thereof. However, the scope of the claims should not be limited by the preferred embodiments set forth in the examples, but should be given the broadest interpretation consistent with the description as a whole. The specification and drawings are, accordingly, to be regarded in an illustrative rather than a restrictive sense.

What is claimed:

1. A hydrodemolition apparatus for removing a liner material from the inside surface of a cylindrical structure, comprising a support for supporting the cylindrical structure in a horizontal orientation, a rotation mechanism cooperating with the support to enable the cylindrical structure to be rotated about a longitudinal axis of the structure and an elongated boom partially insertable into the structure, a first end of said boom comprising one or more nozzles oriented to deliver a pressurized jet of water to the liner to disintegrate the liner by hydrodemolition, a boom support for a portion of said boom that is distal from said first end of said boom, said boom support being located outside of said cylindrical structure, and a displacement mechanism for displacing said boom in a longitudinal direction, characterized in that:

said apparatus further comprises at least one boom end support adjacent said first end of said boom, said at least one boom end support being adapted to roll circumferentially along the inside of said cylindrical structure; and wherein said one or more nozzles comprises: a first set of nozzles connected to a first source of pressurized water to impinge on the inside of the cylindrical structure at a first location; a second set of nozzles connected to a second source of pressurized water at a higher pressure than said first source; said second set of nozzles being spaced downstream from said first set of nozzles along a longitudinal direction of said boom to impinge on the inside of the cylindrical structure at a second location downstream from said first location.

2. The apparatus of claim 1 wherein said at least one boom end support comprises at least one support roller having an axis of rotation that is parallel to a longitudinal axis of said boom.

3. The apparatus of claim 1 further comprising at least two bracing rollers radially spaced in relation to said first end of said boom, the axis of rotation of said bracing rollers being parallel to the longitudinal axis of the boom.

4. The apparatus of claim 2 wherein said at least one support roller is spaced longitudinally away from said first end of said boom in relation to the location of said nozzles.

* * * * *